Dec. 8, 1970  R. C. SCHWINDY  3,545,043
APPARATUS FOR PLASTIC FILM PRODUCTION
Filed Nov. 6, 1967  2 Sheets-Sheet 1

Dec. 8, 1970   R. C. SCHWINDY   3,545,043
APPARATUS FOR PLASTIC FILM PRODUCTION
Filed Nov. 6, 1967   2 Sheets-Sheet 2

United States Patent Office 3,545,043
Patented Dec. 8, 1970

3,545,043
APPARATUS FOR PLASTIC FILM PRODUCTION
Robert Charles Schwindy, Terre Haute, Ind., assignor to Ethyl Corporation, New York, N.Y., a corporation of Virginia
Filed Nov. 6, 1967, Ser. No. 680,833
Int. Cl. B29d 23/04
U.S. Cl. 18—14
5 Claims

ABSTRACT OF THE DISCLOSURE

A coaxial adapter apparatus for the production of multilayer thermoplastic film. The adapter is coupled between two plastic extruders and a tubular film die. A body member provides an axial opening in which is seated a mandrel assembly which divides a side entering stream of thermoplastic into an inner cylindrically shaped portion and an outer annular shaped coaxial layer surrounding an annular center layer of different thermoplastic material supplied by a second extruder through the bottom opening of the body. An adjustable restrictor ring surrounds the upper potrion of the mandrel assembly and is positioned by means of a plurality of adjustable push-pull bolts in order to provide control of the thickness of the outer layer of the multilayer film. Precise control of the thickness of the inner and outer layers is essential to prevent curl of the multilayer film along the edges thereof.

BACKGROUND OF THE INVENTION

Field of the invention

This invention relates to an adapter for attachment to a plastic extruder for the preparation of multilayer thermoplastic film by the blown bubble process.

Description of the prior art

A method and apparatus for the production of multilayer tubular thermoplastic film by coaxially melt extruding two or more different thermoplastic compositions into tubing is disclosed in U.S. Patent 3,223,761. Each thermoplastic material which ultimately is to form one or more layers in the composite tubing is fed to the coaxial adapter from separate conventional thermoplastic extruders. The coaxial adapter provides a body portion having a cylindrical chamber which communicates with a conventional annular die for the production of thin wall, lay-flat thermoplastic tubing. The thermoplastic material for forming the outer wall and the innermost wall of the tubing is fed into the side of the chember and is formed by means of a mandrel assembly into a continuous annular stream in contact with the interior wall of the chamber. The mandrel also produces a cylindrically shaped central stream from part of the thermoplastic entering from the side which is later formed into the innermost wall of the finished tubing. The thermoplastic material for forming the center or interior wall between the outermost wall and the innermost wall of the final tubing is fed into the bottom opening of the chamber and is converted by a mandrel assembly into an annular coaxial stream concentric with the inner and outer walls. The adapter thus provides a solid cylindrically shaped stream made up of coaxially aligned separate melted plastic materials which have a Reynolds number below the threshhold of turbulence so that the streams do not intermix. The concentric cylinder solid stream of thermoplastic material is then passed into an annular die assembly having a mandrel which axially pierces and radially distributes the cylindrical stream into a tubular stream having at least three layers of plastic material therein. The pierced stream is then extruded through the lips of the die to form seamless, lay-flat. multilayer tubing which can be converted into film sheeting if desired.

While the apparatus of the foregoing patent provides a satisfactory product for many multilayer films it has been found that somewhat better control is needed for the wall thickness of the outer layer of film in order to overcome a lay-flat problem occurring when particular combinations of thermoplastic materials were made into multilayer films. In the manufacture of a multilayer film having a polypropylene center wall coated with a low density polyethylene inner wall and outer wall, problems were experienced in maintaining lay-flat of the film sheeting slit from this tubing. Quite often the film edges had a tendency to curl up or down depending upon the relative thickness of the inner and outer wall. Films made from a high density polyethylene center wall with a low density inner wall and outer wall multilayer product also were found to curl along one or both edges when slit into film.

By use of the apparatus of the present invention precise control of the thickness of the outer layer of the film is achieved so that it may be exactly balanced with the thickness of the interior layer of thermoplastic material. The film made from this tubing evidenced little or no tendency to curl on the edges.

SUMMARY OF THE INVENTION

The apparatus aspects of the present invention may be carried out in a device for the control and distribution of multi-component thermoplastic streams which apparatus has a body having an axial cylindrical passage therethrough and a transverse opening connecting with the passage. A mandrel is received within the axial opening to divide a flow of thermoplastic material entering the transverse opening into a first and second stream. The first stream surrounds the exterior and the second stream is positioned within the interior of a third stream of thermoplastic material which enters through the bottom of the axial opening. An adjustable restrictor ring is spaced from and surrounds a part of the upper portion of the mandrel.

DESCRIPTION OF THE PREFERRED EMBODIMENTS

The coaxial extrusion adapter apparatus, designated generally by the numeral 10, is designed to be attached to two or more conventional thermoplastic extruders and to have mounted on its upper surface an annular die for extruding thin wall thermoplastic tubes for making film by the inflated bubble process. The accessory apparatus for use with the present adapter is clearly shown and described in U.S. Patent 3,223,761 the disclosure of which is hereby incorporated by reference into the present disclosure.

Figure 2:
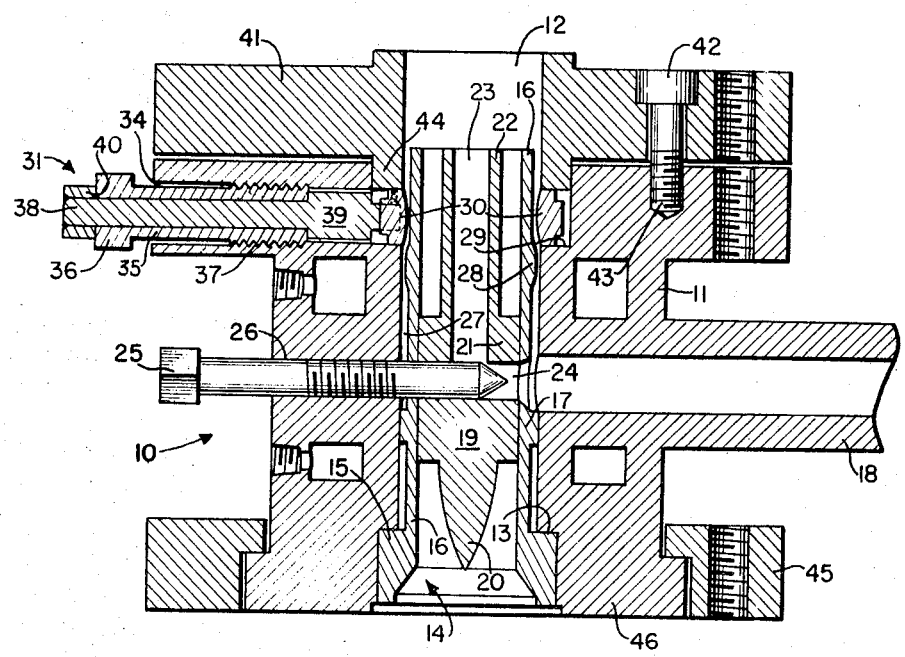
FIG. 2 is an elevational sectional view taken along line 2—2 of FIG. 1.
Figure 3:
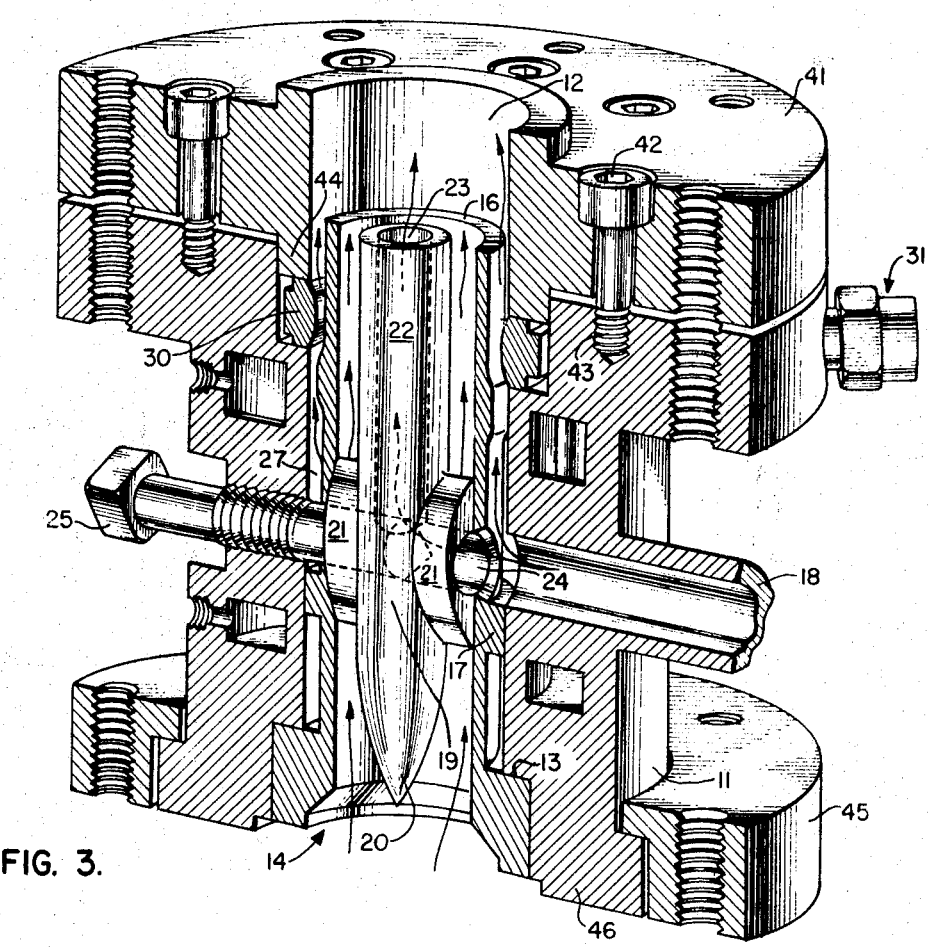
FIG. 3 is a perspective elevational sectional view taken along line 3—3 of FIG. 1.
Figure 4:
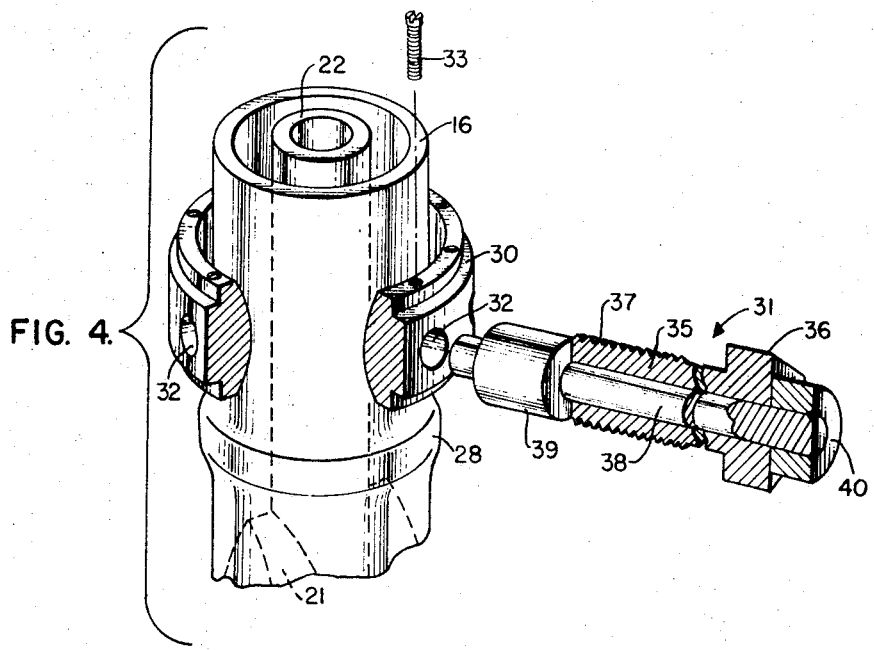
FIG. 4 is an enlarged perspective view, with parts in section, of a part of the mandrel assembly showing the restrictor ring with the push-pull control bolts.

The coaxial extrusion adapter apparatus of the present invention includes a generally cylindrical body portion 11 having an axial, cylindrical chamber or opening 12 provided therein. The lower or bottom face of the body portion 11 of the adapter is counterbored to provide an annular shoulder 13 surrounding the entry end of the opening 12. A generally cylindrical mandrel assembly, designated generally by the numeral 14, is received in opening 12. The mandrel is provided with a base portion having an annular collar 15 seating against the shoulder 13 provided in the bottom face of the body 11. The mandrel assembly includes cylindrical tube 16 which projects upwardly into the cylindrical opening 12. The tube 16 is provided with an annular, integrally formed, transversely extending ring 17 which forms a tight press fit with the interior walls of the cylindrical opening in the body portion 11. This ring prevents the passage of thermoplastic material from the second thermoplastic inlet pipe 18 from entering the annular space between the cylindrical tube 16 and the interior wall of the body. As seen more clearly in FIG. 3 the cylindrical tube 16 has mounted therein a torpedo section 19 which has a generally conically shaped lower portion 20 adapted to pierce the plastic stream (as shown by the arrows) entering the bottom of the cylindrical opening 12 in the body. The torpedo section 19 is attached to the interior wall of cylindrical tube 16 by means of two opposed spider sections 21—21. The spider may be conveniently attached to the cylindrical tube 16 by means of welds. The torpedo section 19 has a generally cylindrical upper portion 22 which provides a cylindrical axial opening 23 therein. As seen in FIGS. 2 and 3 the axial opening 23 communicates with the second thermoplastic inlet pipe 18 by means of a transverse cylindrical opening 24 which extends through both spiders 21—21. A metering pin 25 is mounted in an opening 26 in the body opposite opening 24 and has its conical point positioned in the portion of the passage 24 in the right-hand spider 21 to control the flow of thermoplastic material from inlet pipe 18 into the cylindrical opening 23 of the torpedo.

The portion of the cylindrical tube 16 which is above the transverse ring 17 has an outside diameter somewhat smaller than the diameter of the cylindrical opening 12 thereby providing an annular passage 27 which receives a portion of the flow of thermoplastic material entering through inlet pipe 18. A slight bulge 28 is provided in cylindrical tube 16 between the transverse ring 17 and upper end thereof. The bulge 28 is provided to wipe out the weld lines produced by the spiders 21—21 in the annular band of thermoplastic material flowing up through passage 27.

The face of the body 11 is provided with a counterbore surrounding the cylindrical opening 12 to provide an upwardly facing shoulderd 29. A restrictor ring 30 has its lower edge seated on shoulder 29. A plurality of centering bolt assemblies, designated generally by the numeral 31, have the inner ends of the shaft portions 38 received in cylindrical openings 32 provided in the back side of restrictor ring 30. Set screws 33 removably attach the inner end of each shaft 38 to the restrictor ring 30. Each centering bolt assembly 31 is received in a radial opening 34 provided in the top portion of body 11. These openings are equally spaced around the circumference of upper flange portion of body 11. Each bolt assembly includes a sleeve portion 35 rotatably mounted on shaft 38. Each sleeve has a bolt head 36 on the outer end thereof and a threaded portion 37 at the other end thereof. As seen in FIG. 2 the threaded portion engages a threaded section provided within the radial opening 34. A cylindrical shaft 38 extends through the sleeve 35 and has its inner end attached to a restrictor ring 30 as described above. The shaft 38 has an enlarged cylindrical portion 39 designed to prevent melt leakage through the openings 34. The back side of cylindrical portion 39 abuts the forward end of the sleeve portion 35. An annular collar 40 is welded to the outer end of the shaft 38 and abuts the outer face of bolt head 36. The sleeve 35 rotates freely on shaft 38 so that when the bolt head 36 is rotated clockwise the forward end of the sleeve 35 turns against the back face of the large cylindrical portion 39 of the shaft and forces the shaft 38 forward causing inward movement of that particular portion of the restrictor ring 30. Counterclockwise rotation of the sleeve 35 causes the face of bolt head 36 to be pressed against collar 40 to move the shaft 38 rearwardly thereby pulling restrictor ring 30 open.

A top flange 41 is attached to body 11 by means of cap screws 42 received in threaded openings 43 provided in the top face of body 11. The flange is provided with a downwardly extending collar portion 44 which presses against the top surface of the restrictor ring 30. By properly torquing cap screws 42 the restrictor ring can be effectively sealed to the mating surfaces of the flange 41 and the body 11 to prevent flow of thermoplastic between these contacting surfaces. It is preferred that the torquing be set to a point where the centering bolt assemblies can be moved to cause expansion or restriction of the centering ring without the use of undue force, i.e., less than that which would strip the threaded portion 37 of the sleeves 35.

In operation the coaxial extrusion adapter apparatus 10 is coupled to a primary extruder (not shown) utilizing flange 45 received on collar 46 which is provided on the bottom of body 11. Conventional bolts may be used to couple the apparatus or a quick connect clamp can be used. The second thermoplastic inlet pipe 18 is provided with a bolt or a quick connect clamp (not shown) for attachment to the secondary extruder which will provide the thermoplastic material used to form the exterior and the interior layers on the multilayer plastic tube formed by the die.

Figure 1:
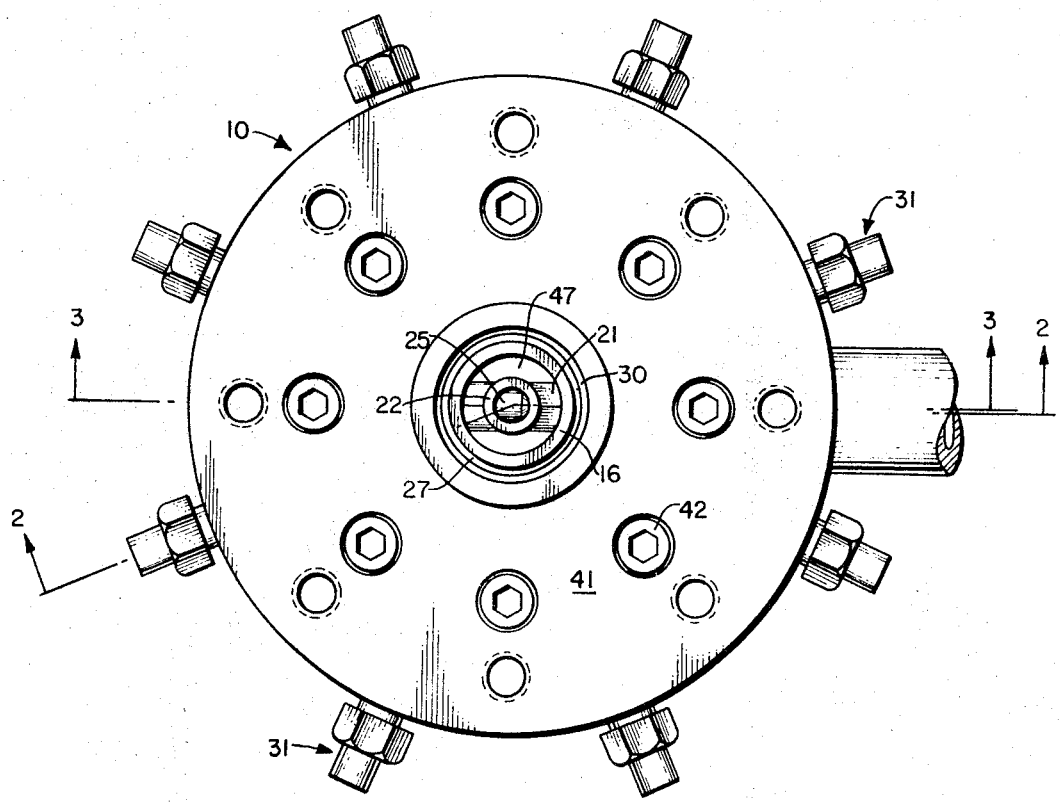
FIG. 1 is a plan view of a coaxial extrusion adapter constructed in accordance with the present invention.

Referring now to FIG. 3 the primary thermoplastic material which would form the interior or center layer of the multilayer film enters the bottom of opening 12 in the bottom of body 11 where it is pierced by the cone portion 20 of the mandrel to form the cylindrical stream into an annular stream. This stream is bisected by the two opposing spiders 21—21 and the two portions of plastic then flow through the space 47 (see FIG. 1) provided between the interior wall of cylindrical tube 16 and the upper portion 22 of the torpedo. The two streams reunite to form an annular stream confined by the cylindrical tube 16 and torpedo section 22. The secondary thermoplastic flow enters the inlet pipe 18 and divides as shown by the arrows on FIG. 3 with a portion of the stream flowing through opening 24 into the interior 23 of the upper section 22 of the torpedo tube 19. The amount of thermoplastic flowing through the opening 24 is determined by the setting of metering pin 25. The remainder of the plastic material entering the inlet pipe 18 flows into the annular passage 27 defined by the cylindrical interior wall of the body 11 and the cylindrical exterior wall of the cylindrical tube 16 portion of the mandrel assembly as shown by the arrows in FIG. 3. As the three separate streams of thermoplastic material move past the top of the mandrel assembly 14 they are united into a single solid cylindrical stream of thermoplastic material which moves up into the die (not shown) in laminar flow to maintain the separate identity of each of the respective layers of different material.

A balance between the thickness of the inner layer and outer layer of thermoplastic material is obtained by adjusting the metering pin 25 to provide a course adjustment of thickness. After the extrusion equipment (i.e., the extruders, adapter and the die) has come to a uniform temperature adjustments are made to the restrictor ring 30 by means of the plurality of push-pull centering bolt assembly 31 to balance the thickness of the outside layer of thermoplastic with the innermost layer to provide film with good lay-flat properties, i.e., one which shows no tendency to curl.

The apparatus of the present invention provides the advantage that adjustments to compensate for asymmetry present in the outer film layer of the multilayer film may be made while the extruders are in operation without shutting down the extrusion line. Samples of film may be periodically taken to determine lay-flat properties.

*Example I.*—The film extrusion equipment was assembled substantially as described in U.S. Pat. 3,223,761 except that the flattened tube of film was split into two sheets which were further slit into four rolls of film. A 2½″ diameter barrel extruder was coupled to the bottom of the coaxial adapter of the present invention to feed the plastic for the center layer of the film and a 3½″ diameter barrel extruder was coupled to the side inlet pipe 18 to feed the plastic for the inner and outer layer of a three layer film. Each extruder was started up on low density polyethylene resin and then the 2½″ extruder was switched to polypropylene. The metering pin 25 was adjusted to 5¼ turns from full closed to give the desired balance of thickness between the center and the inner and outer layers of the three layer film. The four slit film webs had pronounced edge curl initially. Adjustment of the restrictor ring 30 by screwing in or out on the push-pull bolt assemblies 31 compensated for the nonuniform flow of resin within the coaxial adapter to produce film having little or no edge curl in any of the four rolls. The film averaged about 1 mil in thickness with the polypropylene center layer being about 0.5 mil and the inner and outer polyethylene layers about 0.25 mil each in thickness. The film had a modulus at 1 percent elongation of 58,000 p.s.i. in the machine direction. After ageing for one day the film modulus increased to 61,060 p.s.i.

*Example II.*—The same procedure was used as in Example I above except that a different polyethylene resin was used. The metering pin 25 was adjusted to give a film containing about 33⅓ percent polypropylene in the inner layer, i.e., a center layer thickness of about 0.33 mil. This finished film had a modulus of 46,940 p.s.i. and little or no pronounced tendency to curl on the edges.

While there has been described what is at present considered preferred embodiments of the present invention, it will be apparent to those skilled in the art that various modifications and changes may be made without departing from the essence of the invention. It is intended to cover herein all such modifications as come within the true spirit and scope of the claims.

What is claimed is:

1. In an apparatus for controlling and distributing multi-component thermoplastic streams, the combination comprising: a body having a cylindrical, longitudinal passage therethrough, said body being counterbored at each end to provide an outwardly facing annular shoulder surrounding the terminal portions of said passage, said body being provided with a transverse opening intermediate said annular shoulders; a mandrel received within said passage, said mandrel having an annular collar on one end seated on one of said shoulders, an outer annular wall having its upper portion spaced from the wall of said body and extending above the other of said shoulders to define an annular flow path between said outer annular wall and said body wall, an inner annular wall spaced inwardly and concentric with said outer annular wall defining an annular flow path therebetween, an opening being provided at the lower end of said inner annular wall communicating with the transverse opening in said body and with the flow path between said outer annular wall and said body wall; an annular restrictor ring having its lower edge abutting the other of said shoulders, said ring surrounding and being spaced from said outer annular wall adjacent its upper end; a plurality of bolt assemblies threadedly received in radial openings provided in said body opposite said restrictor ring, each of said bolt assemblies having an externally threaded sleeve portion rotatably mounted on a non-rotating shaft, said shaft having its inner end attached to said restrictor ring whereby rotation of said sleeve moves said shaft to change the spacing of said restrictor ring from said outer annular wall adjacent the point of engagement of said shaft end with said restrictor ring; and compression means abutting the upper edge of said restrictor ring to hold the lower edge of said ring in abutment with the other of said shoulders.

2. The apparatus of claim 1 wherein in each of said bolt assemblies said threaded sleeve portion is mounted on an intermediate portion of said non-rotating shaft in abuttment with a stop member provided on each end of said shaft.

3. The apparatus of claim 1 wherein the inner end of said shaft is removably attached to said restrictor ring.

4. The apparatus of claim 1 wherein said compression means includes an annular flange attached to the end of said body, said flange having a collar portion received in the upper portion of the other of said counterbores.

5. The apparatus of claim 1 wherein said outer annular wall of said mandrel is provided with an increased diameter portion immediately below said restrictor ring.

References Cited

UNITED STATES PATENTS

| | | | |
|---|---|---|---|
| 2,736,921 | 3/1956 | Mulbarger et al. | 18—14GX |
| 3,134,832 | 5/1964 | Smith | 18—14VX |
| 3,223,761 | 12/1965 | Raley | 18—145X |
| 3,323,172 | 6/1967 | Pierson et al. | 18—14G |

WILBUR L. McBAY, Primary Examiner